R. COLE.
GRAIN DRILL SHOE.
APPLICATION FILED JUNE 5, 1908.
909,991.
Patented Jan. 19, 1909.
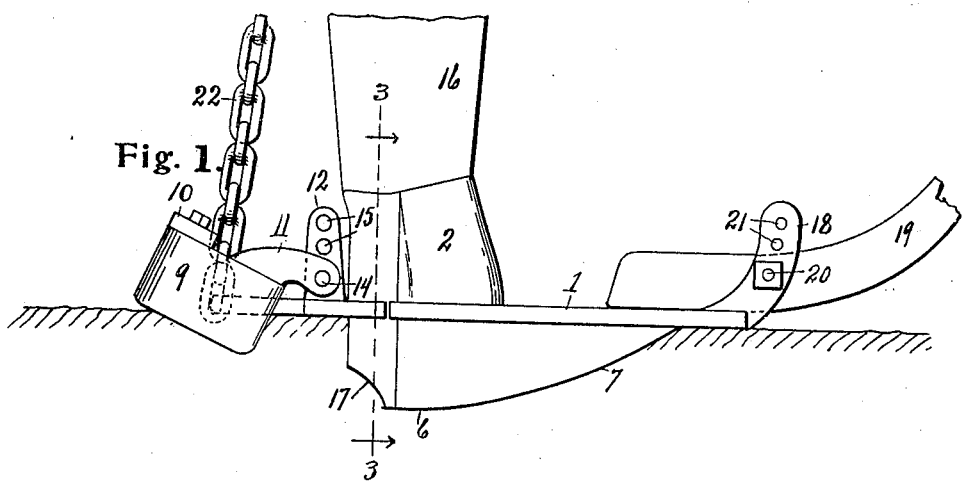
Fig. 1.
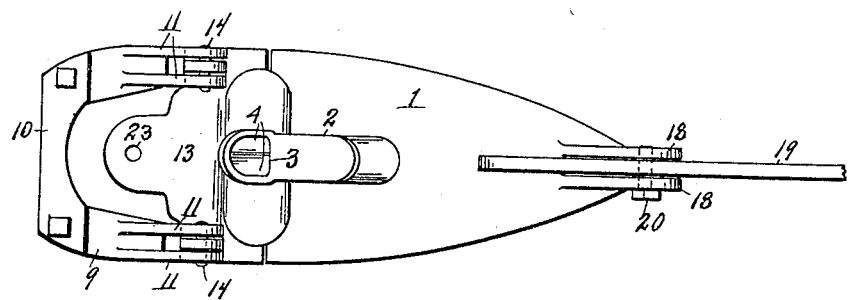
Fig. 2.
Fig. 3.
Fig. 4.
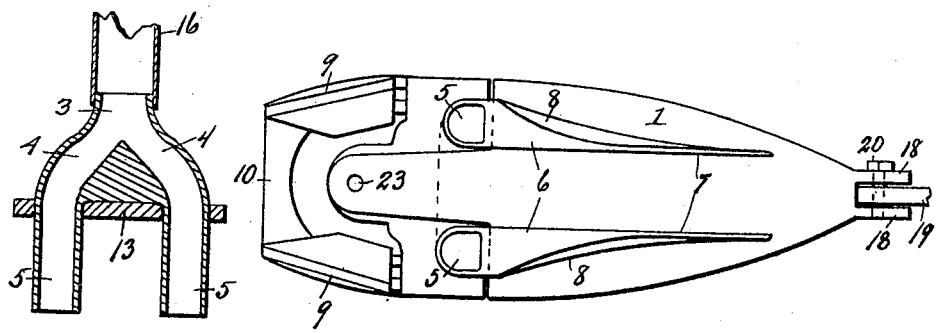
Witnesses
O. B. Baenziger
J. G. Howlett
Inventor
Riley Cole.
By T. D. Wheeler & Co.
Attorneys
THE NORRIS PETERS CO., WASHINGTON, D. C.

UNITED STATES PATENT OFFICE.

RILEY COLE, OF HUDSON, MICHIGAN.

GRAIN-DRILL SHOE.

No. 909,991.　　　Specification of Letters Patent.　　　Patented Jan. 19, 1909.

Application filed June 5, 1908. Serial No. 436,760.

*To all whom it may concern:*

Be it known that I, RILEY COLE, a citizen of the United States, residing at Hudson, in the county of Lenawee, State of Michigan, have invented certain new and useful Improvements in Grain-Drill Shoes; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to grain drills and particularly to grain-drill shoes, and consists in the construction and arrangement of parts hereinafter more fully set forth and pointed out particularly in the claims.

The object of the invention is to provide simple and efficient means for placing the grain in the ground at a uniform depth, for distributing the grain in the ground so as to avoid a surplusage at any one point and to provide for positively covering the grain in a manner to insure a uniform quantity of dirt thereon.

The above object is obtained by the structure illustrated in the accompanying drawings, in which:—

Figure 1 is a side elevation of a grain drill shoe embodying my invention, the draw bar to which the shoe is attached being broken away, as well as the top of the boot through which the grain is fed to the shoe. Fig. 2 is a top plan view of Fig. 1 with the boot removed and the lifting chain omitted. Fig. 3 is a vertical section as on line 3—3 of Fig. 1. Fig. 4 is an inverted plan of the shoe.

Referring to the characters of reference, 1 designates the top plate of the shoe which is preferably triangular in form being tapering towards its forward end. At the rear of said plate and integral therewith is a tube 2 having the feed opening 3 therein which is divided to form the diverging channels 4 which connect with the vertical feed spouts 5 respectively that pass through the rear ends of the runners or furrow openers 6, as clearly shown in Figs. 3 and 4. The runners 6 are arranged parallel a suitable distance apart and extend longitudinally of the under side of the plate 1 to which they are attached, the forward ends of said runners curving upwardly and being comparatively sharp, as shown at 7. The runners 6 are straight on their inner faces, but their outer faces curve outwardly, as shown at 8 forming mold boards which turn the dirt away from the furrows formed by the runners so as to allow the seed or grain deposited from the feed spouts to freely enter therein. By this arrangement the ground between the runners remains practically undisturbed while that which is thrown outwardly by the mold boards is deposited in ridges by the sides of the furrows.

For the purpose of properly covering the grain which is deposited in the furrows from the spouts 5, cover plates or scrapers 9, are employed, which stand in a slightly oblique position with respect to the furrows with their rear ends converging, and are so positioned in the rear of the shoe as to cross the ridges of earth turned out of the furrows by the mold boards of the runners, as will be readily seen on reference to Fig. 4. The coverers or scrapers are connected at their rear ends by a cross bar 10 and are provided at their forward ends with the ears 11 which embrace the vertical studs 12 projecting from the rear cross plate 13 of the shoe, said ears receiving the pins 14 which pass therethrough and through said studs to pivot the scrapers or coverers thereto. For the purpose of adjusting the coverers so that the required quantity of dirt may be scraped over the grain in the furrows, the studs 12 are provided with a series of apertures 15 to enable the coverers to be raised or lowered as conditions may require.

Resting upon the tube 2 is the usual conducting boot 16 through which the grain is fed to the spouts 5 in the shoe. It will be noted that the rear walls of the spouts at their lower ends are cut away, as shown at 17 in Fig. 1, thereby preventing the dirt clogging therein and leaving the opening through the spouts always free for the passage of the grain.

At the forward end of the plate 1 are the upwardly curved ears 18 between which is secured the curved draw bar 19 by means of a transverse bolt 20. The ears 18 are provided with apertures 21 for the purpose of effecting a vertical adjustment of the shoe with respect to the draw bar to regulate the depth at which the runners shall enter the ground.

It is often found necessary to raise the shoes of a grain drill when transporting the drill from place to place, and for that purpose a chain 22 is attached to the rear cross plate 13, whereby the shoe may be lifted, as will be well understood, there being in the rear of said plate an aperture 23 in which said chain engages.

It will now be understood that as the shoe is drawn along, the runners 7 enter the ground the required depth and make furrows therein into which the grain is deposited from the spouts at the rear of said runners, the grain being covered by the obliquely disposed covers 9 which carry the dirt thrown out by the mold boards of the runners back into the furrows so as to perfectly cover the grain and level the ground in the rear of the shoe.

It will be apparent that by means of this improved grain drill shoe, the grain is well distributed in the ground, obviating the depositing of an excessive quantity at any one point and providing for perfectly covering the grain in the furrows, producing in effect a double row instead of a single row of grain and obviating excessive distances between the grain rows. By more thoroughly distributing the grain in the ground, better results are attained in the matter of growth, thereby increasing the yield per acre.

Having thus fully set forth my invention, what I claim as new and desire to secure by Letters Patent, is:—

1. In a grain drill, the combination of a shoe having a flat top plate, two runners secured to the bottom of said plate and arranged in parallel relation, a grain discharge tube divided at its lower end to form two spouts which spouts descend at the rear of said runners, and hinged coverers attached to the shoe and trailing in the rear thereof.

2. In a grain drill, the combination of a flat top plate, parallel runners depending from the under face of said plate, said runners having mold boards at their rear ends, grain spouts passing downwardly through the rear ends of said runners, and hinged coverers attached to the rear of the shoe.

3. In a grain drill, the combination of a shoe having a flat top plate, integral runners secured to the under side of the top plate in parallel relation, said runners curving upwardly at their forward ends and provided at their rear ends with mold boards to enable said runners to form grain furrows, a divided grain spout for discharging grain into said furrows, coverers standing diagonally across said furrows and pivoted to the shoe, said coverers trailing in the rear of the runners to carry the dirt into the furrows onto the grain.

4. In a grain drill, the combination of a shoe having a flat top plate which serves to gage the depth of the furrows, two runners secured to the under face of said plate in parallel relation, said runners being straight on their inner faces and their outer faces curving outwardly at their rear ends, diverging grain spouts at the rear of said runners, coverers hinged at the rear of the shoe and connected by a cross plate, said coverers standing obliquely of the furrows and trailing in the rear of the runners.

In testimony whereof, I sign this specification in the presence of two witnesses.

RILEY COLE.

Witnesses:
A. L. TAYLOR,
O. F. RUMSEY.